(12) United States Patent
Gallo

(10) Patent No.: US 10,000,901 B1
(45) Date of Patent: Jun. 19, 2018

(54) SNOW SHOVEL

(71) Applicant: Gerald F. Gallo, Worcester, MA (US)

(72) Inventor: Gerald F. Gallo, Worcester, MA (US)

( * ) Notice: Subject to any disclaimer, the term of this patent is extended or adjusted under 35 U.S.C. 154(b) by 0 days. days.

(21) Appl. No.: 15/859,825

(22) Filed: Jan. 2, 2018

(51) Int. Cl.
*E01H 5/02* (2006.01)
*E01H 5/10* (2006.01)
*F21V 33/00* (2006.01)
*A01B 1/02* (2006.01)

(52) U.S. Cl.
CPC ............... *E01H 5/02* (2013.01); *A01B 1/022* (2013.01); *E01H 5/10* (2013.01); *F21V 33/0084* (2013.01)

(58) Field of Classification Search
CPC .. E01H 5/02; E01H 5/10; A01B 1/022; F21V 33/0084
USPC ....... 294/49, 54.5, 57, 59; 37/230, 265, 285; 126/401
See application file for complete search history.

(56) References Cited

U.S. PATENT DOCUMENTS

| | | | | |
|---|---|---|---|---|
| 1,298,200 A | * | 3/1919 | Gorgey ..................... | E01H 5/02 37/230 |
| 2,699,614 A | * | 1/1955 | Welch ....................... | E01H 5/10 15/236.01 |
| 2,977,695 A | * | 4/1961 | Kesecker ................ | E01H 5/104 126/343.5 R |
| 2,996,111 A | * | 8/1961 | Mocerino ................ | A01B 1/02 126/401 |
| 3,773,375 A | * | 11/1973 | Nehls ..................... | E04D 13/106 15/105 |
| 3,808,631 A | | 5/1974 | Shibata | |
| 4,033,055 A | | 7/1977 | Lazarecky | |
| 4,034,489 A | * | 7/1977 | Hughes, Jr. ............... | E01H 5/02 219/201 |
| 4,865,372 A | * | 9/1989 | Gabriel .................... | A01B 1/00 294/49 |
| 5,810,408 A | * | 9/1998 | Armstrong ............... | A01B 1/00 16/422 |
| D417,825 S | | 12/1999 | Tisbo | |
| 6,003,916 A | * | 12/1999 | Chalmers .................. | E01H 5/10 294/54.5 |
| 6,464,272 B1 | | 10/2002 | Michaud | |
| 6,869,118 B2 | * | 3/2005 | Bradford .................. | A01B 1/02 294/51 |
| 7,716,857 B2 | | 5/2010 | Nagamatsu | |
| 8,240,069 B2 | | 8/2012 | Adinata | |
| 8,550,516 B2 | * | 10/2013 | Best ........................ | A01B 1/02 294/49 |
| 9,469,952 B2 | | 10/2016 | Quinn | |
| 2011/0139763 A1 | * | 6/2011 | Glassman ................. | E01H 5/02 219/236 |
| 2017/0370058 A1 | * | 12/2017 | Herrera ............... | F21V 23/0492 |

FOREIGN PATENT DOCUMENTS

WO        2008127509        10/2008

\* cited by examiner

*Primary Examiner* — Dean J Kramer

(74) *Attorney, Agent, or Firm* — Kyle A. Fletcher, Esq.

(57) ABSTRACT

The snow shovel comprises a shovel with a de-icing system and a light. The shovel may comprise a plurality of wheels at the bottom rear side of the blade. The light is battery operated and illuminates the work area in front of the shovel. The de-icing system comprises a fluid system, a heat system, or both. The fluid system dispenses a de-icing fluid from a tank onto the blade when activated by a control on the grip of the handle. The heat system directs a flame fueled by propane gas towards the blade when activated by controls on the grip of the handle.

14 Claims, 5 Drawing Sheets

SNOW SHOVEL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of snow removal tools, more specifically, a snow shovel.

SUMMARY OF INVENTION

The snow shovel comprises a shovel with a de-icing system and a light. The shovel may comprise a plurality of wheels at the bottom rear side of the blade. The light is battery operated and illuminates the work area in front of the shovel. The de-icing system comprises a fluid system, a heat system, or both. The fluid system dispenses a de-icing fluid from a tank onto the blade when activated by a control on the grip of the handle. The heat system directs a flame fueled by propane gas towards the blade when activated by controls on the grip of the handle.

An object of the invention is to provide a snow shovel with a fluid de-icing system.

Another object of the invention is to provide a snow shovel with a heating system for the blade.

A further object of the invention is to provide a snow shovel, which illuminates a work are in front of the snow shovel.

Yet another object of the invention is to provide a snow shovel with wheels behind the blade.

These together with additional objects, features and advantages of the snow shovel will be readily apparent to those of ordinary skill in the art upon reading the following detailed description of the presently preferred, but nonetheless illustrative, embodiments when taken in conjunction with the accompanying drawings.

In this respect, before explaining the current embodiments of the snow shovel in detail, it is to be understood that the snow shovel is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the snow shovel.

It is therefore important that the claims be regarded as including such equivalent construction insofar as they do not depart from the spirit and scope of the snow shovel. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
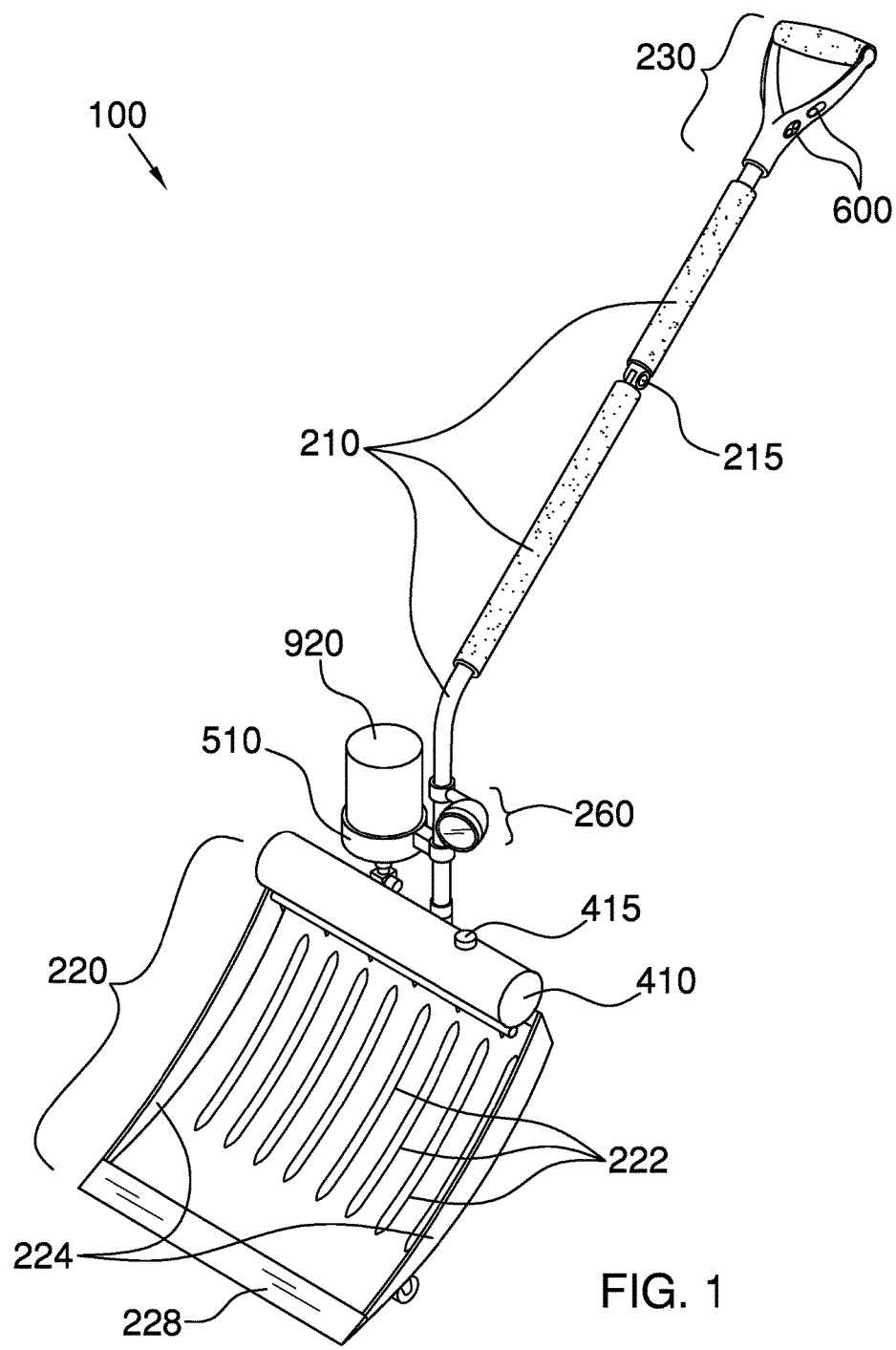
FIG. 1 is a perspective view of an embodiment of the disclosure.
Figure 2:
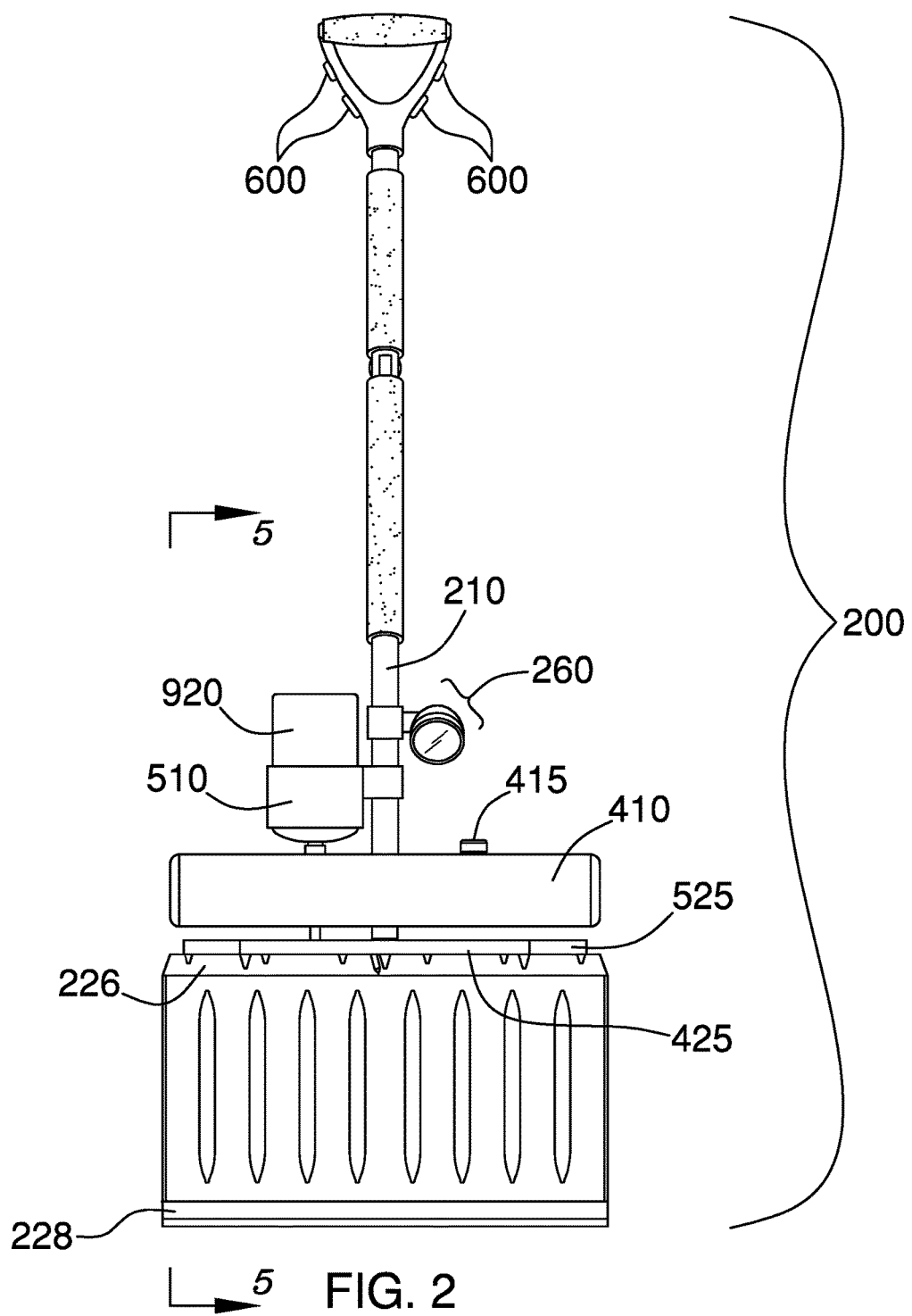
FIG. 2 is a front view of an embodiment of the disclosure.
Figure 3:
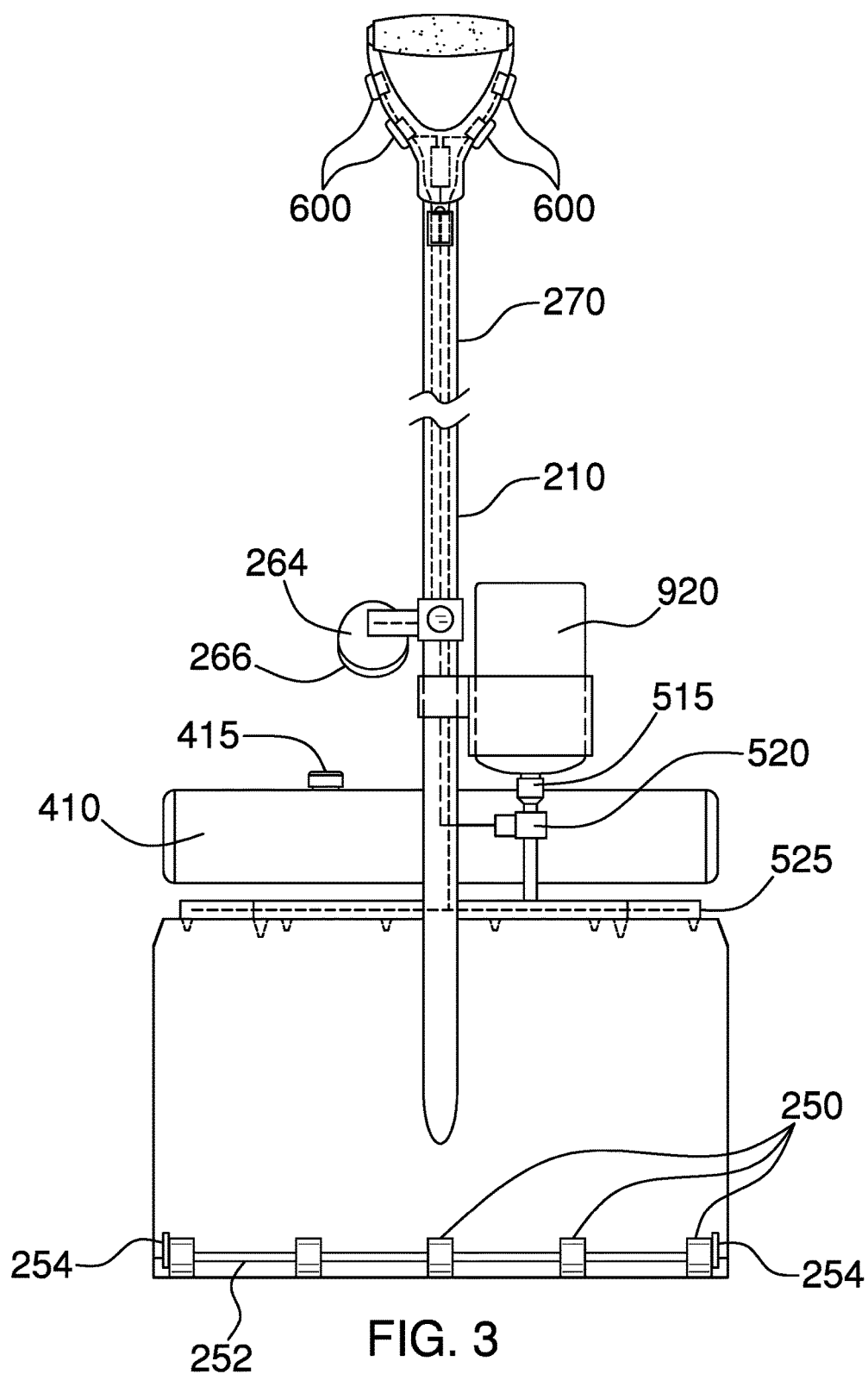
FIG. 3 is a rear view of an embodiment of the disclosure.
Figure 4:
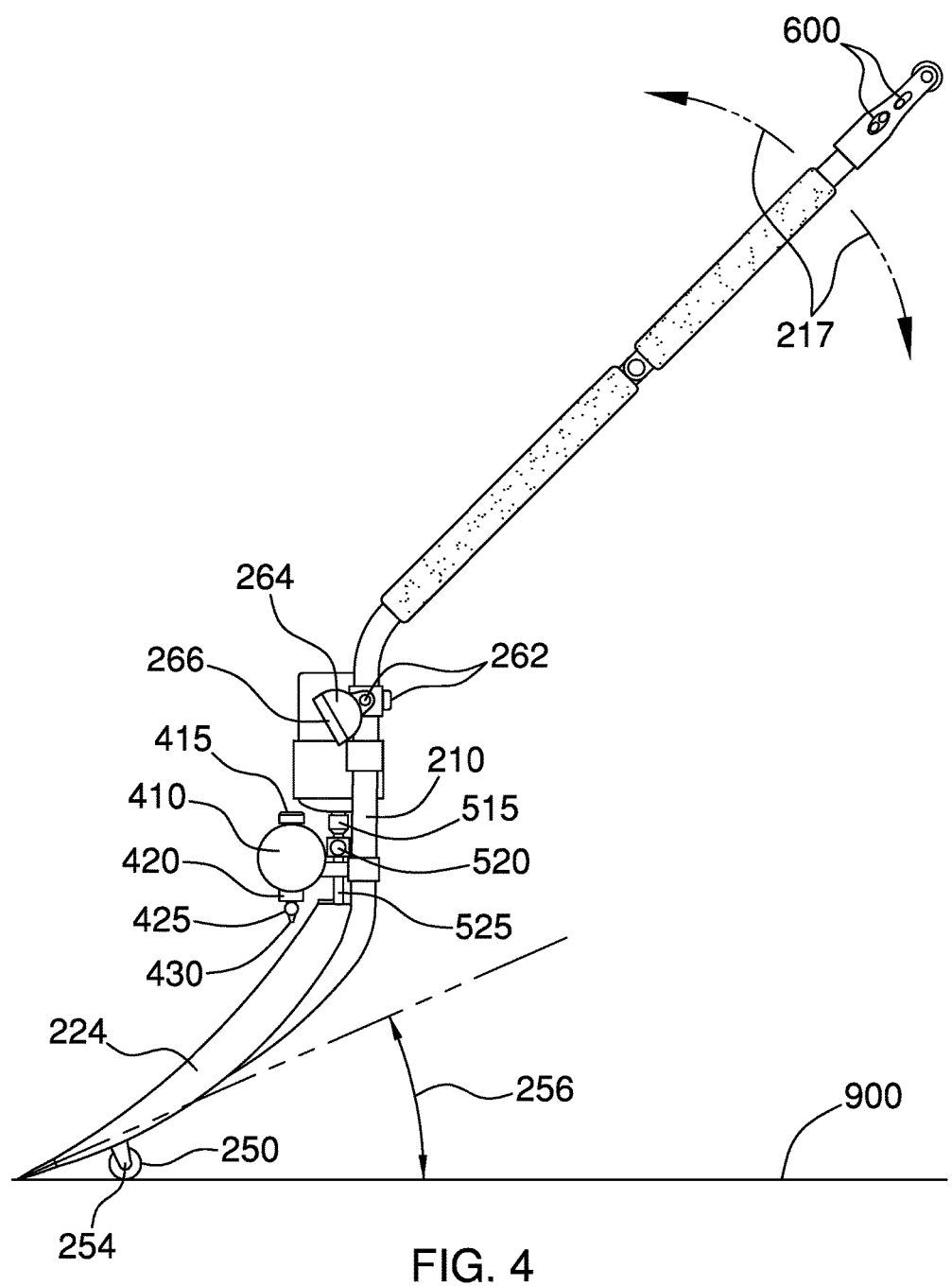
FIG. 4 is a side view of an embodiment of the disclosure.
Figure 5:
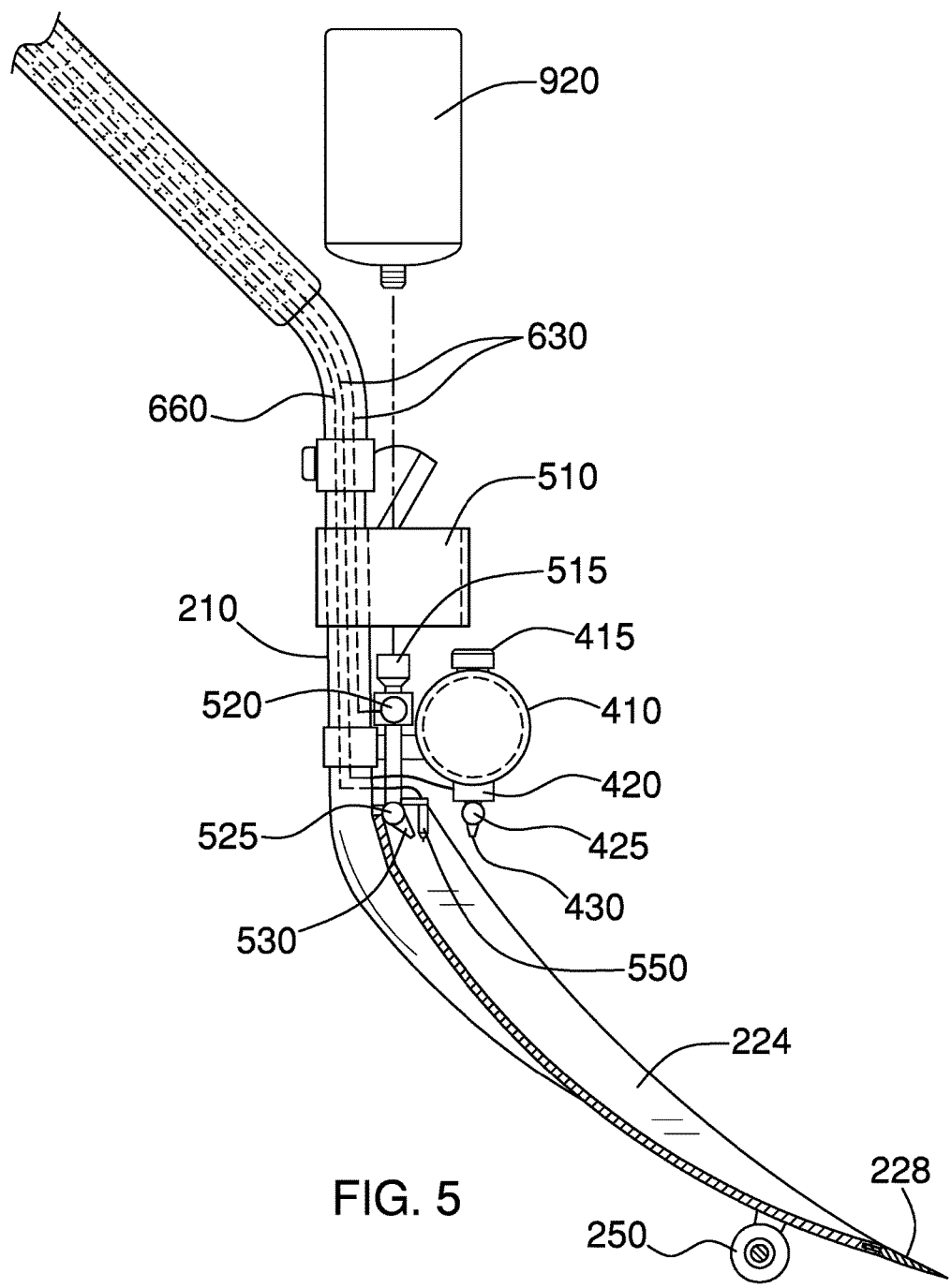
FIG. 5 is a cross-sectional view of an embodiment of the disclosure.

Detailed reference will now be made to a first potential embodiment of the disclosure, which is illustrated in FIGS. 1 through 5.

The snow shovel 100 (hereinafter invention) comprises a shovel 200, a de-icing system, and a light 260. The invention 100 is a tool for removing wintry precipitation (not illustrated in the figures) from a surface being cleared 900. The invention 100 may provide mechanisms for de-icing a blade 220 of the shovel 200. The invention 100 may provide the light 260 for illuminating a work area.

Throughout this disclosure, up and down directional references are made within a gravitational frame of reference—down is the direction that gravity pulls an object and up in the opposite of down. Front, back, left and right are defined with respect to a user (not illustrated in the figures)—the left of the shovel 200 is the same side as the left of the user and right is the opposite of left. The front of the user and the front of the shovel 200 are oriented in the same direction and the rear is the side that is opposite the front. Throughout this disclosure "lateral" refers to a side-to-side direction and "longitudinal" refers to a top-to-bottom direction with top being a hand grip 230 and bottom being the blade 220.

The shovel 200 comprises the blade 220, a shaft 210, and the hand grip 230. The shovel 200 may be a tool for lifting or pushing the wintry precipitation off of the surface being cleared 900.

The blade 220 may be an area at the lower end of the shovel 200 where the wintry precipitation is scooped during forward motion of the shovel 200. The blade 220 may be flat in a lateral direction. The blade 220 may be curved in a concave direction longitudinally with the center of the blade 220 being farther to the rear than either the top or bottom of the blade 220. The blade 220 may be fabricated from a metal. In some embodiments, the metal may be aluminum.

In some embodiments, the blade 220 may comprise a plurality of ridges 222 that run in a longitudinal direction to prevent the wintry precipitation from moving laterally as it is scooped onto the shovel 200. In some embodiments, the blade 220 may comprise a blade sides 224. The blade sides 224 may prevent the wintry precipitation from falling off the side of the blade 220 while the invention 100 is being used. In some embodiments, the blade 220 may comprise a blade back 226 to prevent the wintry precipitation from being pushed off the rear side of the blade 220.

The blade 220 may comprise a wear strip 228. The wear strip 228 may be a sacrificial edge on the bottom of the blade 220. The wear strip 228 may make contact with the surface being cleared 900 when the invention 100 is in use.

The blade 220 may comprise a plurality of wheels 250. The plurality of wheels 250 may be evenly spaced along an axle 252 which is separated from the rear of the blade 220 by a two or more standoffs 254. The plurality of wheels 250 may be positioned such that both the plurality of wheels 250 and the bottom of the wear strip 228 make contact with the surface being cleared 900 when the blade 220 is held at a specific angle of attack 256. In some embodiments, the specific angle of attack 256 may be 15 degrees 5 degrees.

The shaft 210 may be a handle running longitudinally from the top of the blade 220 to the bottom of the hand grip 230. The shaft 210 may be fabricated from a rigid material. In some embodiments, the shaft 210 may be fabricated from aluminum. The shaft 210 may be curved to reduce back strain. The shaft 210 may comprise a shaft hinge 215 to allow the a shaft angle 217 to be changed in order to reduce back strain. The shaft hinge 215 may be loosened for adjustment of the shaft angle 217 and then tightened for use of the invention 100.

The shaft 210 may be hollow. The shaft 210 may comprise a pathway for a plurality of cables 630 and a plurality of wires 660 running from a plurality of controls 600 on the hand grip 230 to the light 260 and the de-icing system. The de-icing system may mount onto the shaft 210 at the bottom of the shaft 210. The shaft 210 may house one or more batteries 270 that provide electrical energy for the operation of the light 260 and a plurality of igniters 550.

The hand grip 230 may be an area of the invention 100 adapted for grasping by a hand of the user. As a non-limiting example, the hand grip 230 may be triangular in shape with a base of the triangle oriented laterally at the top of the hand grip 230 and the apex of the triangle coupled to the top of the shaft 210. In some embodiments, at least a portion of the hand grip 230 may be cushioned for comfort. The hand grip 230 may comprise the plurality of controls 600 to activate and deactivate the de-icing system and the light 260.

The de-icing system may comprise a fluid dispensing system, a heating system, or both. In some embodiments where both the fluid dispensing system and the heating system are provided, care must be taken to either use a de-icing fluid that is non-flammable or to not use both the fluid dispensing system and the heating system at the same time.

The light 260 may be a device that illuminates the work area in front of the blade 220. The light 260 an one or more bulbs (not illustrated in the figures) in a housing 264 with a transparent lens 266 covering the bulbs. As a non-limiting example, the one or more bulbs may be one or more LED or incandescent bulbs. The light 260 may be adjustable in height, elevation angle, or both by loosening one or more threaded knobs 262, changing the position of the light 260, and tightening the one or more threaded knobs 262. The light 260 may be powered by the one or more batteries 270 located within the shaft 210. The light 260 may be controlled by a light control (not illustrated in the figures) located on the hand grip 230. The light 260 may be illuminated when the light control is in a light on position and may be extinguished when the light control is in a light off position.

The fluid dispensing system comprises a fluid tank 410, a fluid valve 420, a fluid manifold 425, and a plurality of fluid nozzles 430. The fluid dispensing system may eliminate buildup of the wintry precipitation on the blade 220 by applying the de-icing fluid to the blade 220.

The fluid tank 410 may be a holding reservoir for the de-icing fluid. The fluid tank 410 may be located above the rear of the blade 220, coupled to the shaft 210. In some embodiments, the fluid tank 410 may be cylindrical in shape and may have a capacity of 10 to 50 fluid ounces. The fluid tank 410 may have a cap 415 that is removable for refilling the fluid tank 410. The bottom of the fluid tank 410 may couple to the fluid valve 420. The de-icing fluid may be a liquid that melts the wintry precipitation. As non-limiting examples, the de-icing fluid may be an ethylene glycol mixture, a propylene glycol mixture, an isopropyl alcohol mixture, hot water, or other ice-melting fluid.

The fluid valve 420 may control the flow of the de-icing fluid from the fluid tank 410 to the fluid manifold 425. The fluid valve 420 may be coupled to a fluid control (not illustrated in the figures) on the hand grip 230 via one of the plurality of cables 630. Movement of the fluid control to a fluid on position may be conveyed to the fluid valve 420 via the plurality of cables 630 and may cause the fluid valve 420 to open, allowing the de-icing fluid to flow from the fluid tank 410 into the fluid manifold 425. Movement of the fluid control to a fluid off position may be conveyed to the fluid valve 420 via the plurality of cables 630 and may cause the fluid valve 420 to close, preventing the de-icing fluid from flowing from the fluid tank 410 into the fluid manifold 425.

The fluid manifold 425 may distribute the de-icing fluid that is flowing into the fluid manifold 425 to the plurality of fluid nozzles 430. The plurality of fluid nozzles 430 may coupled to the bottom side of the fluid manifold 425. The fluid manifold 425 may be oriented to run from side-to-side so as to place the plurality of fluid nozzles 430 along the top of the blade 220. The plurality of fluid nozzles 430 may be evenly spaced along the fluid manifold 425. The plurality of fluid nozzles 430 may direct the flow of the de-icing fluid onto the blade 220.

The heating system comprises a propane tank holder 510, a propane tank fitting 515, a propane valve 520, a propane manifold 525, a plurality of propane nozzles 530, and the plurality of igniters 550. The heating system may eliminate buildup of the wintry precipitation on the blade 220 by applying heat to the blade 220.

The propane tank holder 510 couples to the shaft 210 and supports the sides of a propane tank 920, which is held in an inverted position by the propane tank holder 510. The propane tank holder 510 allows the propane tank 920 to rotate about a vertical axis so that the propane tank 920 may be screwed into the propane tank fitting 515 located below the propane tank holder 510. As a non-limiting example, the propane tank 920 may be a standard 1-pound (16 oz) camping propane bottle. The propane tank 920 may supply fuel for the heating system.

The propane tank fitting 515 may provide an attachment point for the propane tank 920. The coupling of the propane tank 920 to the heating system may require that the propane tank 920 may placed threads down on the propane tank fitting 515 and rotated so that the threads on the propane tank 920 mate with complimentary threads on the propane tank fitting 515. As the propane tank 920 is rotated, the threads on the propane tank fitting 515 pull the propane tank 920 down and a center post on the propane tank fitting 515 may open an internal valve of the propane tank 920 to allow propane to flow from the propane tank 920.

The propane valve 520 may control the flow of the propane from the propane tank 920 to the propane manifold 525. The propane valve 520 may be coupled to a fuel control (not illustrated in the figures) on the hand grip 230 via one of the plurality of cables 630. Movement of the fuel control to a fuel on position may be conveyed to the propane valve 520 via the plurality of cables 630 and may cause the propane valve 520 to open, allowing the propane to flow from the propane tank 920 into the propane manifold 525. Movement of the fuel control to a fuel off position may be conveyed to the propane valve 520 via the plurality of cables 630 and may cause the propane valve 520 to close, preventing the propane from flowing from the propane tank 920 into the propane manifold 525.

The propane manifold 525 may distribute the propane that is flowing into the propane manifold 525 to the plurality of propane nozzles 530. The plurality of propane nozzles 530 may coupled to the bottom side of the propane manifold 525. The propane manifold 525 may be oriented to run from side-to-side so as to place the plurality of propane nozzles 530 along the top of the blade 220. The plurality of propane nozzles 530 may be evenly spaced along the propane manifold 525.

The plurality of propane nozzles 530 may direct the propane towards the blade 220. Each of the plurality of propane nozzles 530 may comprise one of the plurality of igniters 550. The plurality of igniters 550 may create a spark when energized by an electrical potential. The source of the electrical potential may be the one or more batteries 270 located in the shaft 210, a magneto (not illustrated in the figures) located in an igniter control (not illustrated in the figures), or a combination thereof. The plurality of igniters 550 may be located such that the spark ignites the propane flowing out of the plurality of propane nozzles 530. The plurality of igniters 550 may be coupled to the igniter control on the hand grip 230 via the plurality of wires 660. Movement of the igniter control to an igniter on position may be conveyed to the plurality of igniters 550 via the plurality of wires 660 and may cause the plurality of igniters 550 to spark, igniting the propane that flows from the plurality of fluid nozzles 430. The igniter control may be a spring-loaded control where the spark is produced as the igniter control is moved to the igniter on position. Holding the igniter control in the igniter on position or allowing the igniter control to return to an igniter off position has no effect on the plurality of igniters 550. To extinguish, flames at the plurality of fluid nozzles 430, the fuel control be moved to the fuel off position.

In preparation for use, the propane tank 920 is coupled to the invention 100 by inverting the propane tank 920, passing the propane tank 920 down through the propane tank holder 510, and rotating the propane tank 920 so that threads mate at the propane tank fitting 515. In addition, the fluid tank 410 may be filled with the de-icing fluid and the cap 415 may be placed on the fluid tank 410. The one or more batteries 270 may be placed into the shaft 210.

In use, the shovel 200 may be used to scrape or push the wintry precipitations from the surface being cleared 900. The plurality of wheels 250 may ease the task if the shovel 200 is held at the specific angle of attack 256. The light 260 may be illuminated if needed by moving the light control to the light on position. If the wintry precipitation begins to cling to the blade 220, the user may activate the fluid dispensing system or the heating system. To activate the fluid dispensing system, the user moves the fluid control to the fluid on position, thus applying the de-icing fluid to the blade 220. To activate the heating system, the user moves the fuel control to the fuel on position and then moves the igniter control to the igniter on position, thus causing heat to be applied to the blade 220. The fluid dispensing system and/or the heating system may be activated and deactivated as often as required to complete the task of clearing the surface being cleared 900. When the task is complete, the light 260 may be extinguished by moving the light control to the light off position, the fluid dispensing system may be deactivated by moving the fluid control to the fluid off position, and the heating system may be deactivated by moving the fuel control to the fuel off position and by moving the igniter control to the igniter off position.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "apex" is the point of an object that has the greatest height, altitude, or distance relative to a given reference.

As used in this disclosure, an "axle" is a cylindrical shaft that is inserted through the center of an object such that the center axis of the object and the center axis of the axle are aligned and the object can rotate using the axle as an axis of rotation.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "blade" is a term that is used to describe a wide and flat structure or portion of a larger structure. Non-limiting examples of object which are or which comprise blades may include a knife, a propeller, a shovel, or a cutting edge of a tool.

As used in this disclosure, "concave" is used to describe a surface that resembles the interior surface of a sphere or a portion thereof.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used herein, to "de-ice" is to remove snow, ice, or frost from a surface. De-icing may involve mechanical action, heating, the use of chemicals, or combinations thereof. A tool or chemical that assists in the de-icing process may be referred to as a "de-icer".

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "grip" is a covering that is placed over a hand hold, handle, shaft, or other object.

As used in this disclosure, a "handle" is an object by which a tool, object, or door is held or manipulated with the hand.

As used in this disclosure, a "hinge" is a device that permits the turning, rotating, or pivoting of a first object relative to a second object.

As used in this disclosure, a "housing" is a rigid casing that encloses and protects one or more devices.

As used herein, the words "invert", "inverted", or "inversion" refer to an object that has been turned inside out or upside down or to the act of turning an object inside out or upside down.

As used in this disclosure, the word "lateral" refers to the sides of an object or movement towards a side. Lateral directions are generally perpendicular to longitudinal directions. "Laterally" refers to movement in a lateral direction.

As used in this disclosure, an "LED" is an acronym for a light emitting diode. An LED allows current to flow in one direction and when current is flowing the LED emits photons. The wavelength of the light that is emitted may be in the visible range of the spectrum or may extend into either the infrared (IR) spectral range or the ultraviolet (UV) spectral range. The brightness of the LED can be increased and decreased by controlling the amount of current flowing through the LED. Multiple LEDs having different emission spectrums may be packaged into a single device to produce a multi-color LED. A broad range of colors may be produced by multi-color LEDs by selecting which of the multiple LEDs are energized and by controlling the brightness of each of the multiple LEDs. Organic LEDs (OLEDs) are included in this definition.

As used in this disclosure, a "lens" is a transparent substance through which light can pass. A lens may or may not be formed with curved surfaces that are used to concentrate or disperse the light that travels through the lens.

As used herein, the word "longitudinal" or "longitudinally" refers to a lengthwise or longest direction.

As used in this disclosure, a "manifold" is a pipe or chamber having several ports through which liquid or gas is gathered or distributed.

As used in this disclosure, a "reservoir" refers to a container or containment system that is configured to store a liquid.

As used herein, the word "sacrificial" refers to a first object that is intended to be eroded or otherwise destroyed in order to protect a second object from being damaged. As a non-limiting example, the sacrificial object may be a trim-piece that is provided to protect an object from wear. In some embodiments, the sacrificial object may be periodically replaced to provide an extended period of protection.

As used in this disclosure, a "shovel" is a tool that is used for lifting and moving bulk items such as dirt, snow, or gravel. A shovel can be a hand tool or a mechanical device.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, a "tool" is a device, an apparatus, or an instrument that is used to carry out an activity, operation, or procedure.

As used in this disclosure, "transparent" refers to a material that allows light to pass through the material without significant scattering such that an object can be clearly seen through the material.

As used in this disclosure, a "valve" is a device that is used to control the flow of a fluid (gas or liquid) through a pipe or to control the flow of a fluid into and out of a container.

As used in this disclosure, "vertical" refers to a direction that is parallel to the local force of gravity. Unless specifically noted in this disclosure, the vertical direction is always perpendicular to horizontal.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A snow shovel comprising:
   a shovel, a de-icing system, and a light;
   wherein the snow shovel is a tool for removing wintry precipitation from a surface being cleared;
   wherein the snow shovel de-ices a blade of the shovel;
   wherein the snow shovel illuminates a work area;
   wherein the shovel comprising the blade, a shaft, and a hand grip;
   wherein the shovel is a tool for lifting or pushing the wintry precipitation off of the surface being cleared;
   wherein the blade is an area at the lower end of the shovel where the wintry precipitation is scooped during forward motion of the shovel;
   wherein the blade is flat in a lateral direction;

wherein the blade is curved in a concave direction longitudinally with the center of the blade;
wherein the blade comprises a wear strip;
wherein the wear strip is a sacrificial edge on the bottom of the blade;
wherein the wear strip makes contact with the surface being cleared when the snow shovel is in use;
wherein the blade comprises a plurality of wheels;
wherein the plurality of wheels are evenly spaced along an axle which is separated from the rear of the blade by a two or more standoffs;
wherein the plurality of wheels are positioned such that both the plurality of wheels and the bottom of the wear strip make contact with the surface being cleared when the blade is held at a specific angle of attack;
wherein the specific angle of attack is 15 degrees+/−5 degrees;
wherein the shaft is a handle running longitudinally from the top of the blade to the bottom of the hand grip;
wherein the shaft is fabricated from a rigid material;
wherein the shaft is curved to reduce back strain;
wherein the shaft comprises a shaft hinge to allow the a shaft angle to be changed;
wherein the shaft hinge is loosened for adjustment of the shaft angle and then tightened for use of the snow shovel;
wherein the shaft is hollow;
wherein the shaft comprises a pathway for a plurality of cables and a plurality of wires running from a plurality of controls on the hand grip to the light and the de-icing system;
wherein the de-icing system mounts onto the shaft at the bottom of the shaft;
wherein the shaft houses one or more batteries that provide electrical energy for the operation of the light and a plurality of igniters.

2. The snow shovel according to claim 1
wherein the hand grip is an area of the snow shovel adapted for grasping by a hand of a user;
wherein the hand grip comprises the plurality of controls to activate and deactivate the de-icing system and the light.

3. The snow shovel according to claim 2
wherein the de-icing system comprises a fluid dispensing system, a heating system, or both.

4. The snow shovel according to claim 3
wherein the light is a device that illuminates the work area in front of the blade;
wherein the light is further defined with one or more bulbs that are positioned within a housing;
said housing is further defined with a transparent lens that covers the one or more bulbs;
wherein the light is adjustable in height, elevation angle, or both by loosening one or more threaded knobs, changing the position of the light, and tightening the one or more threaded knobs;
wherein the light is powered by the one or more batteries located within the shaft;
wherein the light is controlled by a light control located on the hand grip;
wherein the light is illuminated when the light control is in a light on position and is extinguished when the light control is in a light off position.

5. The snow shovel according to claim 4
wherein the fluid dispensing system comprises a fluid tank, a fluid valve, a fluid manifold, and a plurality of fluid nozzles;
wherein the fluid dispensing system eliminate buildup of the wintry precipitation on the blade by applying a de-icing fluid to the blade.

6. The snow shovel according to claim 5
wherein the fluid tank is a holding reservoir for the de-icing fluid;
wherein the fluid tank is located above the rear of the blade, coupled to the shaft;
wherein the fluid tank comprises a cap that is removable for refilling the fluid tank;
wherein the bottom of the fluid tank couples to the fluid valve;
wherein the de-icing fluid is a liquid that melts the wintry precipitation.

7. The snow shovel according to claim 6
wherein the fluid valve controls the flow of the de-icing fluid from the fluid tank to the fluid manifold;
wherein the fluid valve is coupled to a fluid control on the hand grip via one of the plurality of cables;
wherein movement of the fluid control to a fluid on position is conveyed to the fluid valve via the plurality of cables and causes the fluid valve to open, allowing the de-icing fluid to flow from the fluid tank into the fluid manifold;
wherein movement of the fluid control to a fluid off position is conveyed to the fluid valve via the plurality of cables and causes the fluid valve to close, preventing the de-icing fluid from flowing from the fluid tank into the fluid manifold.

8. The snow shovel according to claim 7
wherein the fluid manifold distributes the de-icing fluid that is flowing into the fluid manifold to the plurality of fluid nozzles;
wherein the plurality of fluid nozzles are coupled to the bottom side of the fluid manifold;
wherein the fluid manifold is oriented to run from side-to-side so as to place the plurality of fluid nozzles along the top of the blade;
wherein the plurality of fluid nozzles are evenly spaced along the fluid manifold;
wherein the plurality of fluid nozzles direct the flow of the de-icing fluid onto the blade.

9. The snow shovel according to claim 4
wherein the heating system comprises a propane tank holder, a propane tank fitting, a propane valve, a propane manifold, a plurality of propane nozzles, and the plurality of igniters;
wherein the heating system eliminate buildup of the wintry precipitation on the blade by applying heat to the blade.

10. The snow shovel according to claim 9
wherein the propane tank holder couples to the shaft and supports the sides of a propane tank which is held in an inverted position by the propane tank holder;
wherein the propane tank holder allows the propane tank to rotate about a vertical axis so that the propane tank is screwed into the propane tank fitting located below the propane tank holder;
wherein the propane tank supplies fuel for the heating system.

11. The snow shovel according to claim 10
wherein the propane tank fitting provides an attachment point for the propane tank;
wherein the propane tank is coupled to the heating system by placing the propane tank threads down on the propane tank fitting and by rotating the propane tank so that the threads on the propane tank mate with complimentary threads on the propane tank fitting;

wherein as the propane tank is rotated, the threads on the propane tank fitting pull the propane tank down and a center post on the propane tank fitting opens an internal valve of the propane tank to allow propane to flow from the propane tank.

12. The snow shovel according to claim 11 wherein the propane valve controls the flow of the propane from the propane tank to the propane manifold;

wherein the propane valve is coupled to a fuel control on the hand grip via one of the plurality of cables;

wherein movement of the fuel control to a fuel on position is conveyed to the propane valve via the plurality of cables and causes the propane valve to open, allowing the propane to flow from the propane tank into the propane manifold;

wherein movement of the fuel control to a fuel off position is conveyed to the propane valve via the plurality of cables and causes the propane valve to close, preventing the propane from flowing from the propane tank into the propane manifold.

13. The snow shovel according to claim 12 wherein the propane manifold distributes the propane that is flowing into the propane manifold to the plurality of propane nozzles;

wherein the plurality of propane nozzles are coupled to the bottom side of the propane manifold;

wherein the propane manifold is oriented to run from side-to-side so as to place the plurality of propane nozzles along the top of the blade;

wherein the plurality of propane nozzles are evenly spaced along the propane manifold.

14. The snow shovel according to claim 13 wherein the plurality of propane nozzles direct the propane towards the blade;

wherein each of the plurality of propane nozzles comprises one of the plurality of igniters;

wherein the plurality of igniters create a spark when energized by an electrical potential;

wherein the source of the electrical potential is the one or more batteries located in the shaft, a magneto located in an igniter control, or a combination thereof;

wherein the plurality of igniters are located such that the spark ignites the propane flowing out of the plurality of propane nozzles;

wherein the plurality of igniters are coupled to the igniter control on the hand grip via the plurality of wires;

wherein movement of the igniter control to an igniter on position is conveyed to the plurality of igniters via the plurality of wires and cause the plurality of igniters to spark, igniting the propane that flows from the plurality of fluid nozzles;

wherein the igniter control is a spring-loaded control where the spark is produced as the igniter control is moved to the igniter on position;

wherein to extinguish, flames at the plurality of fluid nozzles, the fuel control is moved to the fuel off position.

* * * * *